US012567350B2

(12) United States Patent
Kim et al.

(10) Patent No.: US 12,567,350 B2
(45) Date of Patent: Mar. 3, 2026

(54) DISPLAY DEVICE AND DISPLAY DRIVING METHOD WITH GRAYSCALE COMPENSATION

(71) Applicant: Samsung Display Co., Ltd., Yongin-Si (KR)

(72) Inventors: Ha Neul Kim, Yongin-si (KR); In Bok Song, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/829,286

(22) Filed: Sep. 10, 2024

(65) Prior Publication Data

US 2025/0273112 A1 Aug. 28, 2025

(30) Foreign Application Priority Data

Feb. 28, 2024 (KR) ........................ 10-2024-0028874

(51) Int. Cl.
*G09G 3/20* (2006.01)

(52) U.S. Cl.
CPC ......... *G09G 3/2007* (2013.01); *G09G 3/2096* (2013.01); *G09G 2320/0233* (2013.01); *G09G 2358/00* (2013.01)

(58) Field of Classification Search
CPC ............... G09G 3/2007; G09G 3/2096; G09G 2320/028; G09G 2358/00
See application file for complete search history.

(56) References Cited

U.S. PATENT DOCUMENTS

| | | | | |
|---|---|---|---|---|
| 9,542,875 | B2 | 1/2017 | Yang et al. | |
| 9,779,651 | B2 * | 10/2017 | Suginohara | H04N 13/324 |
| 10,490,099 | B2 * | 11/2019 | Zavesky | H04N 21/64322 |
| 10,943,502 | B2 * | 3/2021 | Zavesky | H04N 21/64322 |
| 12,406,608 | B2 * | 9/2025 | Chen | G09G 3/20 |
| 2005/0001802 | A1 * | 1/2005 | Lee | G09G 3/3648 345/89 |
| 2010/0091190 | A1 * | 4/2010 | Mino | G02B 26/08 348/E5.099 |
| 2019/0342509 | A1 * | 11/2019 | Li | H04N 5/33 |
| 2022/0230599 | A1 * | 7/2022 | Han | G09G 3/2074 |
| 2024/0138240 | A1 * | 4/2024 | Lee | G02B 3/0043 |

FOREIGN PATENT DOCUMENTS

| | | |
|---|---|---|
| KR | 10-2011-0078984 A | 7/2011 |
| KR | 10-1202037 B1 | 11/2012 |

* cited by examiner

*Primary Examiner* — Gene W Lee
(74) *Attorney, Agent, or Firm* — Innovation Counsel LLP

(57) ABSTRACT

A display device is disclosed that includes a display panel including pixels including first pixels having a first viewing angle and disposed in a first pixel row and second pixels having a second viewing angle and disposed in a second pixel row. The display panel includes a first display area where an image is displayed through the first pixels, and a second display area where an image is displayed through the second pixels. A gate driver provides gate voltages to a first gate line connected to the first pixel row and a second gate line connected to the second pixel row. A data driver provides data voltages to the pixels. A driving controller controls the gate driver and the data driver, and compensates for a grayscale value of at least one first pixel among the first pixels of the second display area.

20 Claims, 10 Drawing Sheets

DISPLAY DEVICE AND DISPLAY DRIVING METHOD WITH GRAYSCALE COMPENSATION

CROSS-REFERENCE TO RELATED APPLICATION

The application claims priority to and the benefit of Korean Patent Application No. 10-2024-0028874, filed on Feb. 28, 2024, which is hereby incorporated by reference for all purposes as if fully set forth herein.

BACKGROUND

1. Field

The present disclosure relates to a display device and a method of driving the same, and more specifically, to a display device including pixels of different viewing angles and a method of driving the same.

2. Discussion

As information technology has developed, use of display devices such as liquid crystal display devices, organic light emitting display devices, and inorganic light emitting display devices has increased.

In general, light emitted from a pixel of a display device may be directed not only to the front but also to the side. Therefore, not only users looking at a display device from the front, but users looking at the display device from the side can see images. Because of this, personal or confidential information may be viewed by people who are not intended to view it.

Recently, display devices have been developed for drivers and passengers in vehicles. Images for driving, such as a speedometer, may be displayed to a driver, and images intended for a passenger may be displayed to the passenger. If the driver's attention is drawn to an image intended for a passenger, it may distract the driver and increase the risk of a vehicle accident.

SUMMARY

The present disclosure may provide a display device that compensates for the decrease in luminance.

The present disclosure may also provide a method of driving the display device.

A display device according to embodiments may include a display panel including pixels including first pixels having a first viewing angle and disposed in a first pixel row and second pixels having a second viewing angle and disposed in a second pixel row, a first display area where an image is displayed through the first pixels, and a second display area where an image is displayed through the second pixels; a gate driver that provides gate voltages to a first gate line connected to the first pixel row and a second gate line connected to the second pixel row; a data driver that provides data voltages to the pixels; and a driving controller that controls the gate driver and the data driver. The driving controller may compensate for a grayscale value of at least one first pixel among the first pixels of the second display area.

In an embodiment, the driving controller compensates for a grayscale value of the at least one first pixel among the first pixels of the second display area based on a grayscale value of the at least one first pixel and a grayscale value of at least one adjacent pixel among the pixels adjacent to the at least one first pixel.

In an embodiment, the driving controller may compensate for the grayscale value of the any one first pixel by performing a convolution operation on the grayscale value of the at least one first pixel and the grayscale value of the at least one pixel with a mask.

In an embodiment, at least one of mask values of the mask may increase as luminance increases.

In an embodiment, the driving controller may predict the luminance based on input image data.

In an embodiment, the driving controller may increase the grayscale value of the at least one first pixel to compensate for the grayscale value of the at least one first pixel.

In an embodiment, the driving controller may compensate for a grayscale value of at least one second pixel among the second pixels of the first display area.

In an embodiment, grayscale values of the first pixels of the second display area before compensation may be a lowest grayscale value.

In an embodiment, grayscale values of the second pixels of the first display area may be a lowest grayscale value.

In an embodiment, the first viewing angle may be wider than the second viewing angle.

In an embodiment, sub-pixels included in each of the second pixels may be surrounded by a partition wall.

In an embodiment, when the image displayed in the second display area includes a predetermined special pattern, the driving controller may apply a gain and an offset to grayscale values of the first pixels of the second display area.

A method of driving a display device including a display panel including pixels including first pixels having a first viewing angle and disposed in a first pixel row and second pixels having a second viewing angle and disposed in a second pixel row, a first display area where an image is displayed through the first pixels, and a second display area where an image is displayed through the second pixels, may include determining mask values of a mask; performing a convolution operation on a grayscale value of any one first pixel among the first pixels of the second display area and a grayscale value of at least one pixel among the pixels adjacent to the any one first pixel with the mask to generate a compensation grayscale value for the one first pixel; and compensating for the grayscale value of the any one first pixel with the compensation grayscale value.

In an embodiment, at least one of the mask values may increase as luminance increases.

In an embodiment, the method of driving the display device may further include predicting the luminance based on input image data.

In an embodiment, the compensation grayscale value may be higher than the grayscale value of the any one first pixel.

In an embodiment, grayscale values of the first pixels of the second display area before compensation may be a lowest grayscale value.

In an embodiment, grayscale values of the second pixels of the first display area may be a lowest grayscale value.

In an embodiment, the first viewing angle may be wider than the second viewing angle.

In an embodiment, the method of driving the display device may further include applying a gain and an offset to grayscale values of the first pixels of the second display area when the image displayed in the second display area includes a predetermined special pattern.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
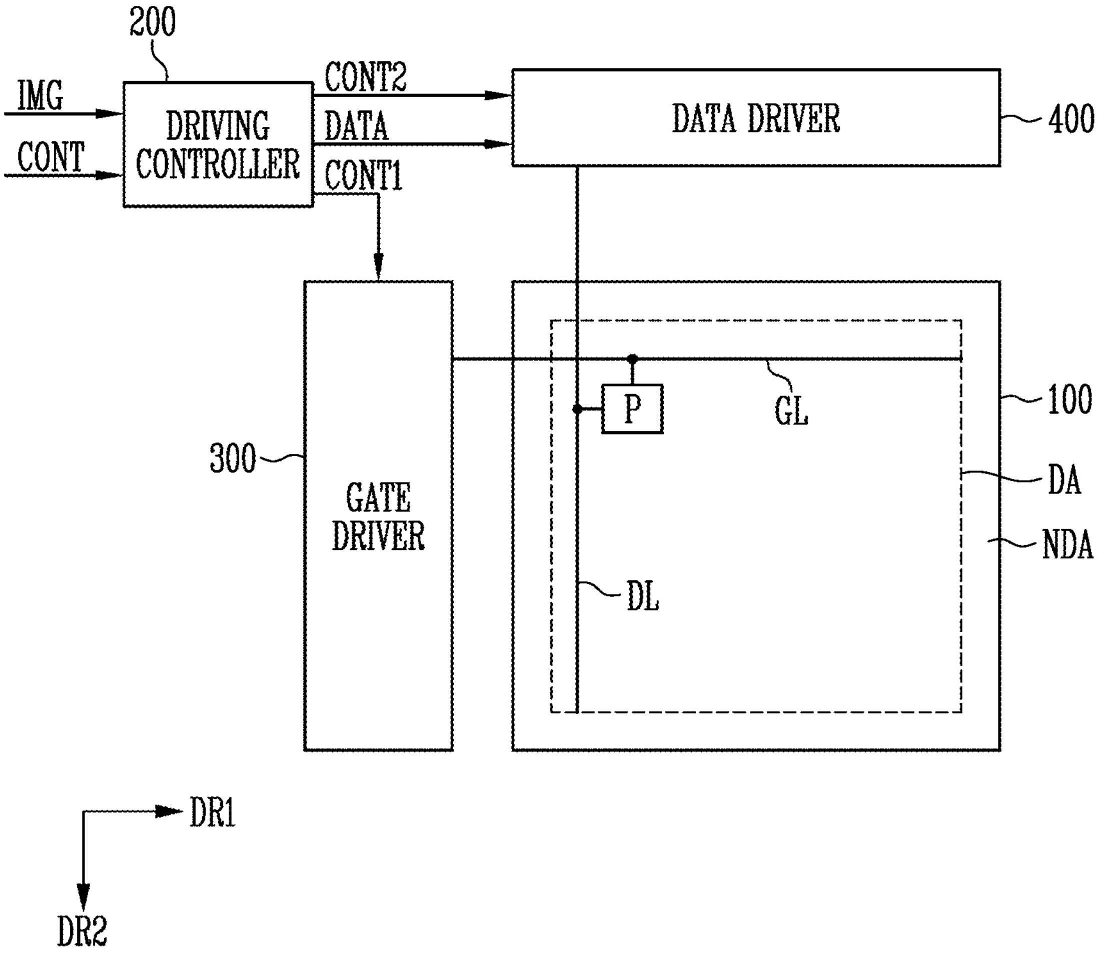
FIG. 1 is a block diagram illustrating a display device according to embodiments of the present disclosure.

Hereinafter, preferred embodiments of the present disclosure will be described in more detail with reference to the accompanying drawings. It should be noted that in the following description, only the parts necessary to understand the operation according to the present disclosure will be described, and descriptions of other parts will be omitted in order to not obscure the gist of the present disclosure. In addition, the present disclosure is not limited to the embodiments described herein and may be embodied in other forms. The embodiments described herein are provided merely to explain in detail enough to enable those skilled in the art to easily implement the technical idea of the present disclosure.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the present disclosure. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing the relationship between one element or feature and another element(s) or feature(s) as shown in the drawings. Spatially relative terms are intended to include other directions in use, in operation, or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the present embodiments are not limited thereto.

Hereinafter, embodiments of the present disclosure will be described in more detail with reference to the attached drawings.

FIG. 1 is a block diagram illustrating a display device according to embodiments of the present disclosure.

Referring to FIG. 1, a display device may include a display panel 100, a driving controller 200, a gate driver 300, and a data driver 400. In an embodiment, each of the driving controller 200, the gate driver 300, and the data driver 400 may be implemented as one or more integrated circuits. In an embodiment, the driving controller 200 and the data driver 400 may be integrated into one chip.

The display panel 100 may include a display area DA that displays an image and a non-display area NDA disposed adjacent to the display area DA. In an embodiment, the gate driver 300 may be mounted in the non-display area NDA.

The display panel 100 may include a plurality of gate lines GL, a plurality of data lines DL, and a plurality of pixels P electrically connected to the gate lines GL and the data lines DL. The gate lines GL may extend in a first direction DR1, and the data lines DL may extend in a second direction DR2 that intersects the first direction DR1.

The driving controller 200 may receive input image data IMG and an input control signal CONT from a main processor (for example, a graphic processing unit (GPU) or the like). In an embodiment, the input image data IMG may include red image data, green image data, and blue image data. In an embodiment, the input image data IMG may further include white image data. In an embodiment, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, and a data signal DATA based on the input image data IMG and the input control signal CONT.

The driving controller 200 may generate the first control signal CONT1 for controlling the operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling the operation of the data driver 400 based on the input control signal CONT and output the second control signal CONT2 to the data driver 400. The second control signal CONT2 may include a horizontal start signal and a load signal.

The driving controller 200 may receive the input image data IMG and the input control signal CONT and generate the data signal DATA. The driving controller 200 may output the data signal DATA to the data driver 400.

The gate driver 300 may generate gate signals for driving the gate lines GL in response to the first control signal CONT1 received from the driving controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the driving controller 200. The data driver 400 may generate data voltages by converting the data signal DATA into an analog voltage. The data driver 400 may output the data voltages to the data lines DL.

Figure 2:
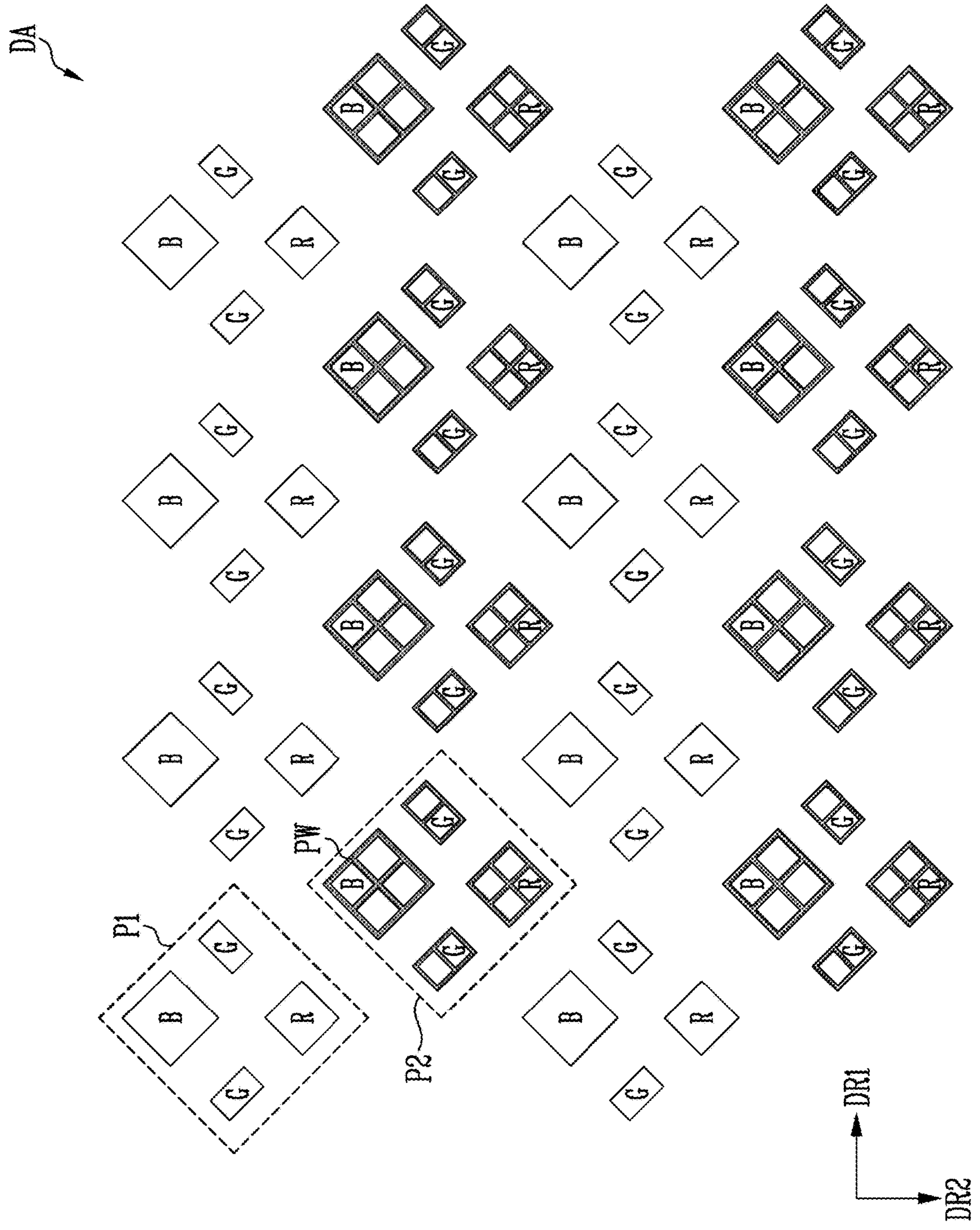
FIG. 2 is a diagram illustrating an example of a pixel structure of a pixel of FIG. 1.
Figure 3:
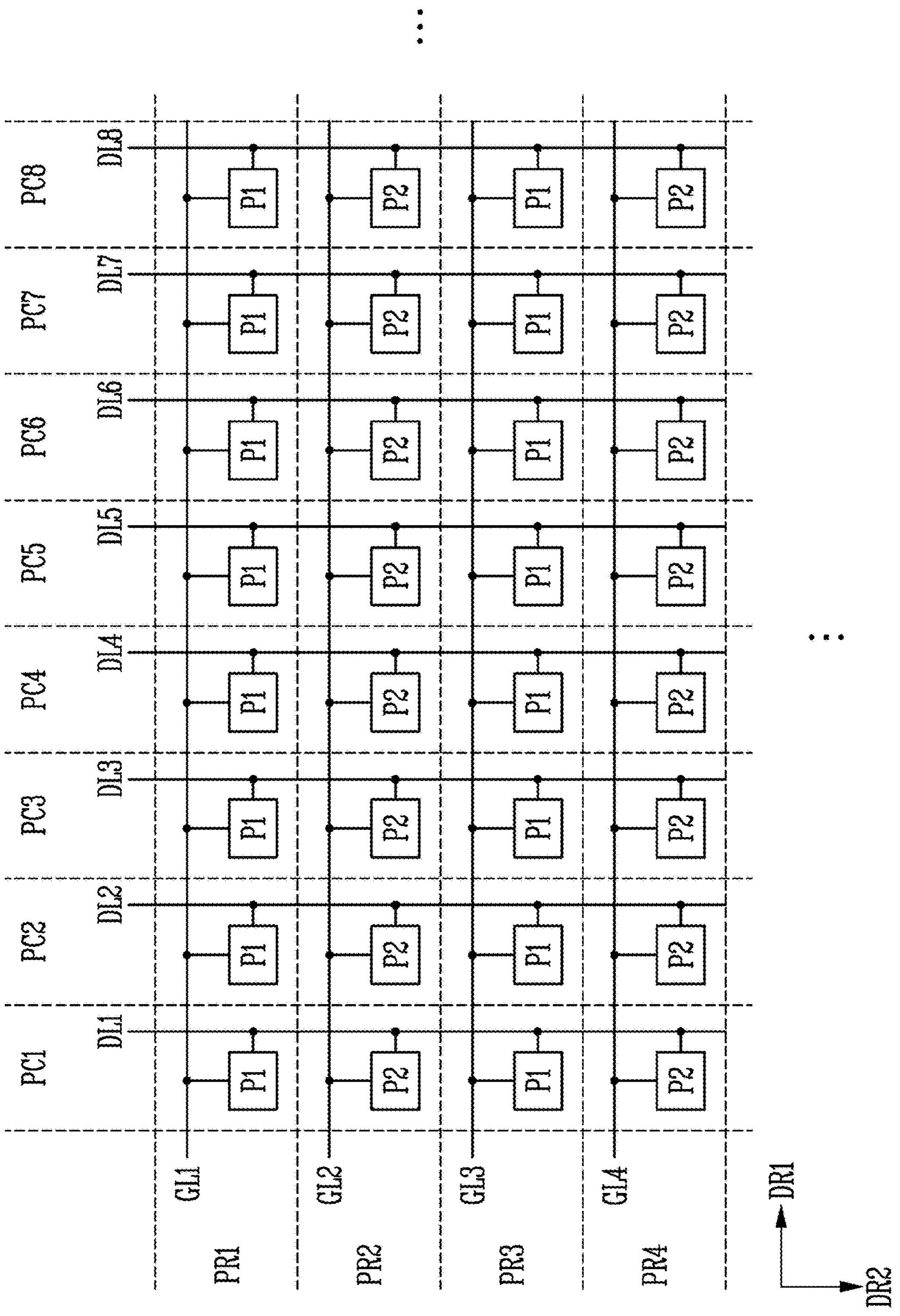
FIG. 3 is a diagram illustrating an example of an arrangement of pixels in FIG. 1.

FIG. 2 is a diagram illustrating an example of a pixel structure of a pixel of FIG. 1. FIG. 3 is a diagram illustrating an example of an arrangement of pixels in FIG. 1.

Referring to FIG. 2, the display area DA may include pixels P (see FIG. 1), and the pixels P may include a first pixel P1 and a second pixel P2.

Each of the first and second pixels P1 and P2 may include first to third sub-pixels R, G, and B. For example, the first sub-pixel R may display red, the second sub-pixel G may display green, and the third sub-pixel B may display blue. However, the present disclosure is not limited to the color displayed by each sub-pixel.

In an embodiment, the first and second pixels P1 and P2 may have a DIAMOND PIXEL™ structure. For example, each of the first and second pixels P1 and P2 may include one first sub-pixel R, two second sub-pixels G, and one third sub-pixel B. In addition, the third sub-pixel B may be larger than the first and second sub-pixels R and G, and the first sub-pixel R may be larger than the second sub-pixel G. However, the present disclosure is not limited to the pixel structure.

The first pixel P1 may have a first viewing angle, and the second pixel P2 may have a second viewing angle narrower than the first viewing angle. For example, the first pixel P1 may be a normal pixel, and the second pixel P2 may be a private pixel.

For example, as shown in FIG. 2, the sub-pixels R, G, and B included in each of second pixels P2 may be surrounded by a partition wall PW. For example, as shown in FIG. 2, a portion of the partition wall PW may overlap the sub-pixels R, G, and B included in each of the second pixels P2 on a plane. For example, the partition wall PW may cross the sub-pixels R, G, and B included in each of the second pixels P2 on a plane. Accordingly, an angle of light emitted from the sub-pixels R, G, and B included in each of the second pixels P2 may be narrowed by the partition wall PW, and viewing angles of the second pixels P2 may be narrowed.

Referring to FIGS. 2 and 3, first pixels P1 may be disposed in odd-numbered pixel rows PR1, PR3, . . . , and second pixels P2 may be disposed in even-numbered pixel rows PR2, PR4, . . . . However, odd numbers and even numbers are only one example, and the present disclosure is not limited to dividing the rows in which the first pixels P1 and the second pixels P2 are disposed into odd numbers and even numbers.

Pixel rows PR1, PR2, . . . may be connected to gate lines GL1, GL2, . . . , respectively. For example, the first pixels P1 of a first pixel row PR1 may be connected to a first gate line GL1, the second pixels P2 of a second pixel row PR2 may be connected to a second gate line GL2, the first pixels P1 of a third pixel row PR3 may be connected to a third gate line GL3, and the second pixels P2 of a fourth pixel row PR4 may be connected to a fourth gate line GL4.

Pixel columns PC1, PC2, . . . may be connected to data lines DL1, DL2, . . . , respectively. For example, the first and second pixels P1 and P2 of a first pixel column PC1 may be connected to a first data line DL1, the first and second pixels P1 and P2 of a second pixel column PC2 may be connected to a second data line DL2, the first and second pixels P1 and P2 of a third pixel column PC3 may be connected to a third data line DL3, and the first and second pixels P1 and P2 of a fourth pixel column PC4 may be connected to a fourth data line DL4.

Figure 4:
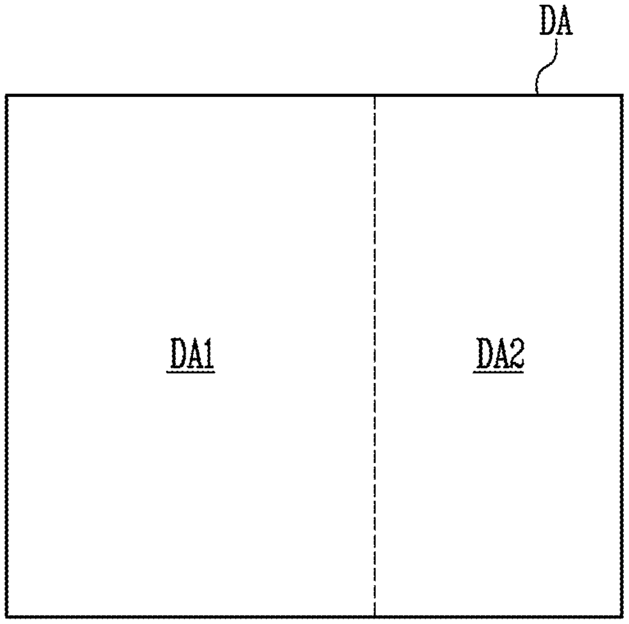
FIG. 4 is a diagram illustrating an example of a display area of FIG. 1.
Figure 5:
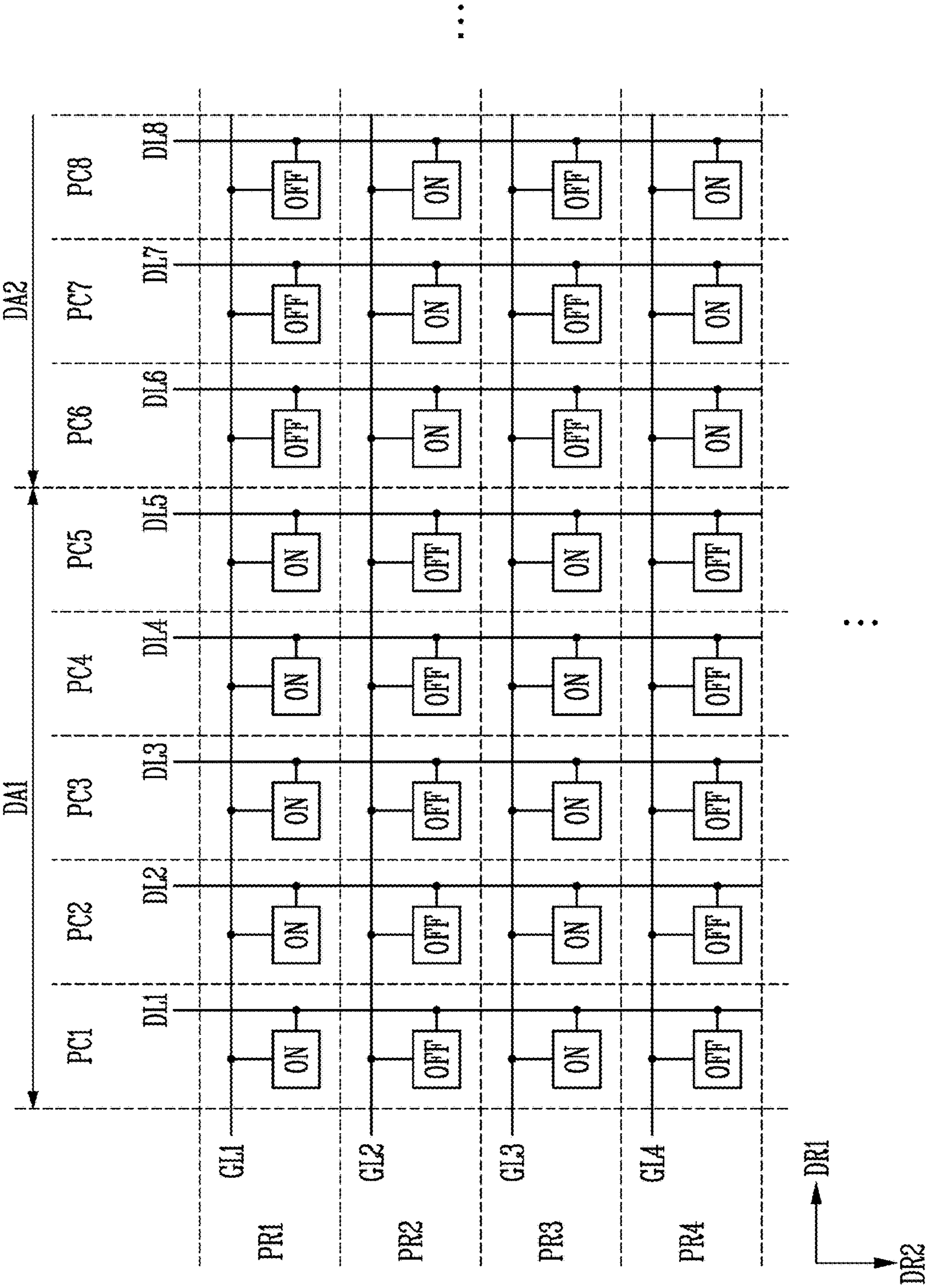
FIG. 5 is a diagram illustrating an example of driving a first display area and a second display area in FIG. 4.

FIG. 4 is a diagram illustrating an example of a display area of FIG. 1. FIG. 5 is a diagram illustrating an example of driving a first display area and a second display area in FIG. 4.

Referring to FIGS. 3, 4, and 5, the display area DA may include a first display area DA1 and a second display area DA2. An image may be displayed through the first pixels P1 in the first display area DA1, and an image may be displayed through the second pixels P2 in the second display area DA2. The image in the second display area DA2 may be exposed only to a user in front of the second display area DA2.

In the present embodiment, although a case in which the first display area DA1 is larger than the second display area DA2 is described as an example, the present disclosure is not limited to the sizes of the first display area DA1 and the second display area DA2.

In the present embodiment, although a case where the non-display area NDA (see FIG. 1) is not disposed between the first display area DA1 and the second display area DA2 is described as an example, the present disclosure is not limited thereto. For example, the non-display area NDA (see FIG. 1) may be disposed between the first display area DA1 and the second display area DA2.

In the first display area DA1, the first pixels P1 may be in an on-state ON, and the second pixels P2 may be in an off-state OFF. In the second display area DA2, the first pixels P1 may be in an off-state OFF, and the second pixels P2 may be in an on-state ON.

An image corresponding to the input image data IMG (see FIG. 1) may be displayed in the first and second pixels P1 and P2 that are in the on-state ON. When compensation, which will be described later, is not performed, black (for example, the lowest grayscale value) may be displayed in the first and second pixels P1 and P2 that are in the off-state OFF regardless of the input image data IMG (see FIG. 1). That is, when compensation, which will be described later, is not performed, an image may be displayed in an odd-numbered pixel row PR1, PR3, . . . of the first display area DA1, and a black line may be displayed in an even-numbered pixel row PR2, PR4, . . . of the first display area DA1. In addition, when compensation, which will be described later, is not performed, a black line may be displayed in an odd-numbered pixel row PR1, PR3, . . . of the second display area DA2, and an image may be displayed in an even-numbered pixel row PR2, PR4, . . . of the second display area DA2. That is, grayscale values of the first and second pixels P1 and P2 that are in the off-state OFF before compensation may be the lowest grayscale values.

The first and second display areas DA1 and DA2 may include fixed black lines so that the first display area DA1 displays an image at a wide viewing angle and the second display area DA2 displays an image at a narrow viewing angle. Also, luminance of the image may be reduced due to the black line. Accordingly, the display device may compensate for the decrease in luminance due to the black line by compensating for the grayscale value of the pixel P (see FIG. 1) where the black line is displayed. A detailed description of this will be described later.

Figure 6:
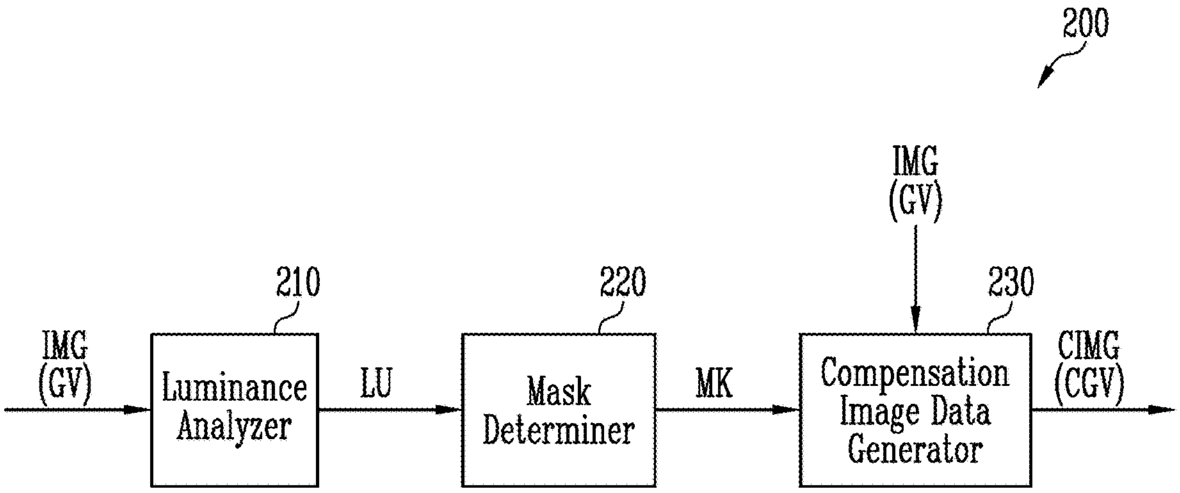
FIG. 6 is a block diagram illustrating an example of a driving controller of FIG. 1.
Figure 7:
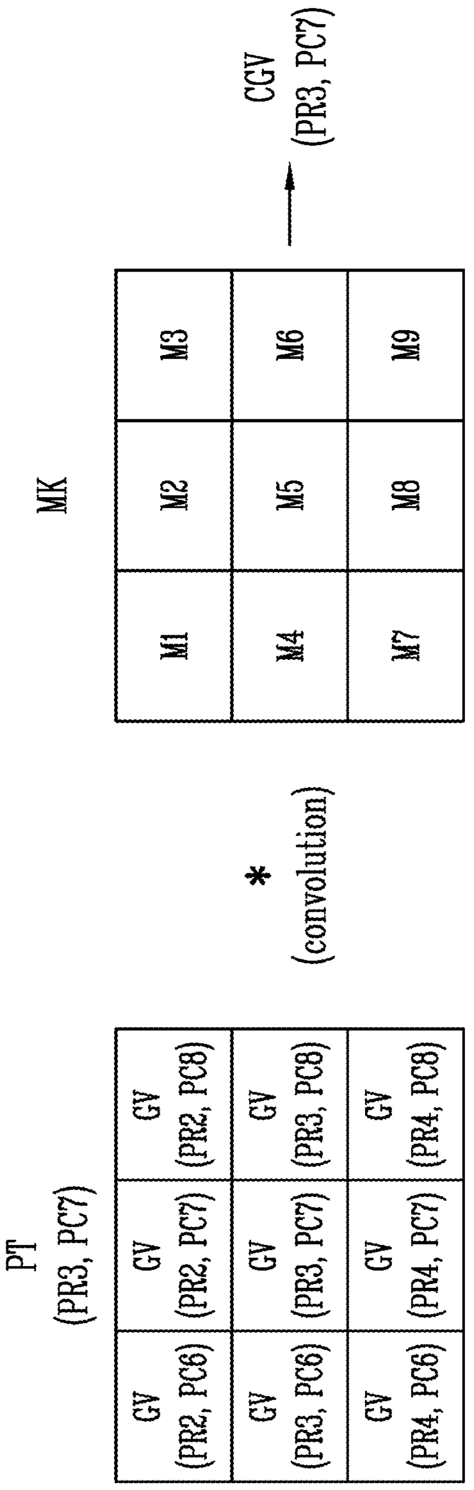
FIG. 7 is a diagram illustrating an example in which a compensation image data generator of FIG. 6 generates a compensation grayscale value.

FIG. 6 is a block diagram illustrating an example of a driving controller of FIG. 1. FIG. 7 is a diagram illustrating an example in which a compensation image data generator of FIG. 6 generates a compensation grayscale value.

FIG. 7 shows an example of determining a compensation grayscale value CGV of a first pixel P1 disposed in a third pixel row PR3 and a seventh pixel column PC7.

Referring to FIGS. 1, 3, 5, 6, and 7, the driving controller 200 may include a luminance analyzer 210, a mask determiner 220, and a compensation image data generator 230.

The luminance analyzer 210 may predict luminance LU based on the input image data IMG. For example, the luminance LU may increase as the sum of grayscale values GV included in the input image data IMG increases. However, the present disclosure is not limited to a method in which the luminance analyzer 210 calculates the luminance (LU) based on the input image data IMG.

The mask determiner 220 may determine mask values M1 to M9 of a mask MK based on the luminance LU. In one frame, the mask MK may have the same mask values M1 to M9.

In an embodiment, at least one of the mask values M1 to M9 may increase as the luminance LU increases. As the mask values M1 to M9 increase, the compensation grayscale value CGV may increase. Therefore, as the luminance LU increases, the mask values M1 to M9 may be increased to reduce a difference in luminance between the image and the black line. A method of determining the compensation grayscale value CGV will be described later.

In an embodiment, the mask values M1 to M9 of the mask MK may have fixed values. For example, the mask MK including fixed mask values M1 to M9 may be stored in a memory device, and the compensation image data generator 230 may receive the mask MK from the memory device and generate compensation image data CIMG. In this case, the driving controller 200 may not include the luminance analyzer 210 and the mask determiner 220.

The compensation image data generator 230 may generate the compensation image data CIMG based on the input image data IMG and the mask MK.

In an embodiment, the compensation image data generator 230 may compensate for a grayscale value GV of at least one first pixel P1 among the first pixels P1 of the second display area DA2. For example, the compensation image data generator 230 may generate the compensation grayscale value CGV for the first pixel P1 based on the grayscale value GV of the first pixel P1 of the second display area DA2 and the and mask MK, and compensate for the grayscale value of the first pixel P1 of the second display area DA2 with the compensation grayscale value CGV.

In an embodiment, the compensation image data generator 230 may compensate for a grayscale value GV of at least one second pixel P2 among the second pixels P2 of the first display area DA1. For example, the compensation image data generator 230 may generate the compensation grayscale value CGV for the second pixel P2 based on the grayscale value GV of the second pixel P2 of the first display area DA1 and the mask MK, and compensate for the grayscale value of the second pixel P2 of the first display area DA1 with the compensation grayscale value CGV.

The compensation image data generator 230 may compensate for the grayscale value GV of any one first pixel P1 among the first pixels P1 of the second display area DA2 based on a grayscale value GV of the any one first pixel P1 and a grayscale value GV of at least one pixel P among the pixels P adjacent to the any one first pixel P1. In an embodiment, the grayscale value GV of the any one first pixel P1 may be compensated by performing a convolution operation on the grayscale value GV of the any one first pixel P1 and the grayscale value GV of the at least one pixel P with the mask MK.

Hereinafter, a detailed description will be made based on the first pixel P1, hereinafter referred to as a reference pixel, disposed in the third pixel row PR3 and the seventh pixel column PC7. For convenience of description, it is assumed that the size of the mask MK is 3×3 pixels. However, the present disclosure is not limited to the size of the mask MK.

A pixel matrix PT including the reference pixel formed to correspond to the size of the mask MK and grayscale values GV of pixels P adjacent to the reference pixel may be generated. Here, the pixels P adjacent to the reference pixel may include the second pixels P2 disposed in the second pixel row PR2 and disposed in sixth to eighth pixel columns PC6 to PC8, the first pixels P1 disposed in the third pixel row PR3 and disposed in the sixth and eighth pixel columns PC6 and PC8, and the first pixels P1 disposed in the fourth pixel row PR4 and disposed in the sixth to eighth pixel columns PC6 to PC8.

In the present embodiment, an example of determining the compensation grayscale value CGV based on grayscale values GV of nine pixels P is described, but the present disclosure is not limited to the number of grayscale values GV for determining one compensation grayscale value CGV.

The compensation grayscale value CGV for the reference pixel may be generated through a convolution operation of the pixel matrix PT and the mask MK. In addition, the compensation grayscale value CGV may be displayed in the reference pixel. That is, the compensation image data generator 230 may generate the compensation image data CIMG including the compensation grayscale value CGV, and the data signal DATA may be generated based on the compensation image data CIMG.

Accordingly, the compensation grayscale value CGV may increase as the grayscale values GV of the pixels P adjacent to the reference pixel increase. Accordingly, a grayscale value higher than the lowest grayscale value may be displayed in an area where the black line is displayed, and the decrease in luminance due to the black line can be compensated.

In an embodiment, when compensating from the first direction DR1, the compensation grayscale value CGV for the first pixel P1 disposed in the third pixel row PR3 and the eighth pixel column PC8 may be used instead of the grayscale value GV of the first pixel P1 disposed in the third pixel row PR3 and the seventh pixel column PC7 in the pixel matrix PT.

In an embodiment, the compensation grayscale value CGV may be determined for each of first to third sub-pixels SP1 to SP3 (see FIG. 2). For example, when the first sub-pixel SP1 (see FIG. 2) displays red, the second sub-pixel SP2 (see FIG. 2) displays green, and the third sub-pixel SP3 (see FIG. 2) displays blue, the compensation grayscale value CGV for red may be generated through the pixel matrix PT for red, the compensation grayscale value CGV for green may be generated through the pixel matrix PT for green, and the compensation grayscale value CGV for blue may be generated through the pixel matrix PT for blue. However, the present disclosure is not necessarily limited to a case of generating the compensation grayscale value CGV by generating the pixel matrix PT for each color. For example, the pixel matrix PT may be formed through the average or sum of red grayscale value, green grayscale value, and blue grayscale value.

Figure 8:
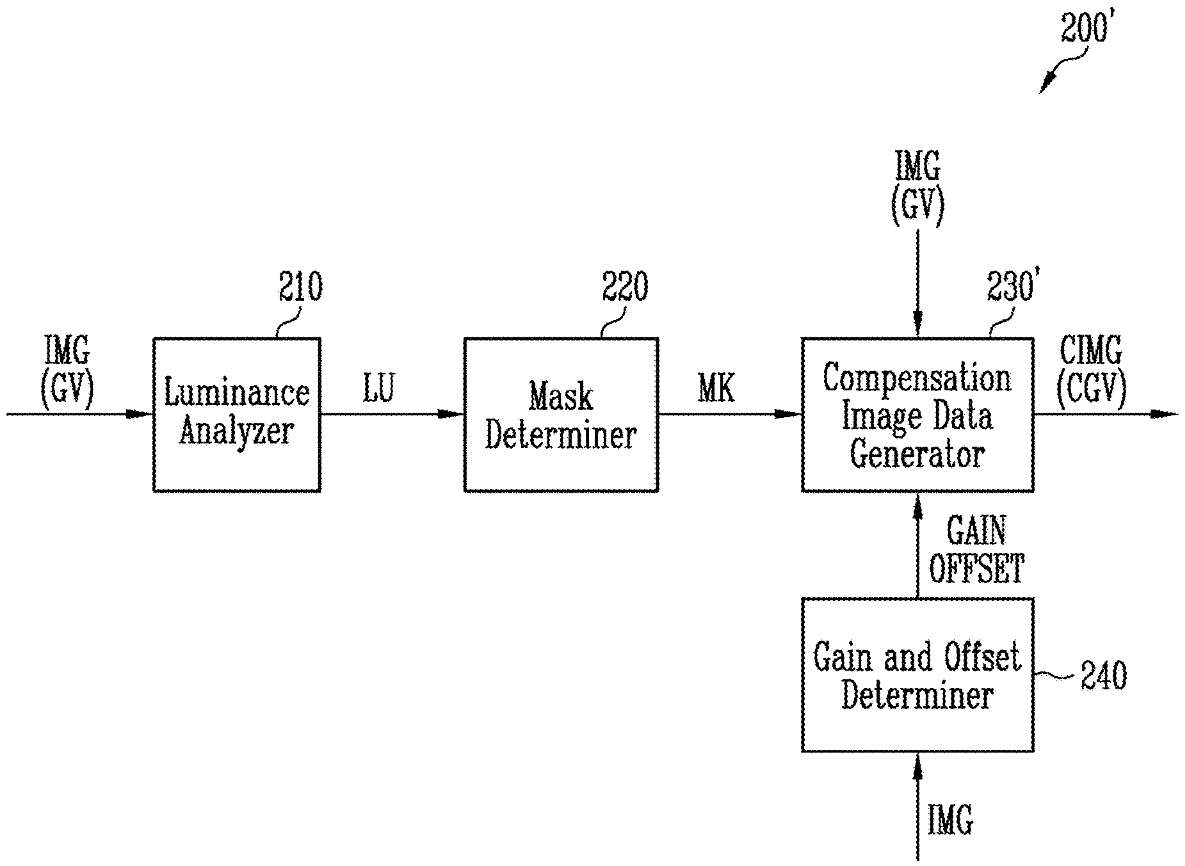
FIG. 8 is a block diagram illustrating an example of a driving controller of the display device according to embodiments of the present disclosure.

FIG. 8 is a block diagram illustrating an example of a driving controller of the display device according to embodiments of the present disclosure.

A driving controller according to the present embodiments may be substantially the same as the driving controller of FIG. 6 except for a gain and offset determiner 240. Therefore, the same reference numbers and symbols will be used for identical or similar components, and redundant description will be omitted.

Referring to FIGS. 3 to 5 and 8, a driving controller 200' may include a luminance analyzer 210, a mask determiner 220, a compensation image data generator 230', and the gain and offset determiner 240.

The gain and offset determiner 240 may determine a gain GAIN and an offset OFFSET based on the input image data IMG and the luminance LU. In an embodiment, when the image displayed in the second display area DA2 includes a predetermined special pattern, which may be referred to as a special pattern, the compensation image data generator 230' may apply the gain GAIN and the offset OFFSET to the grayscale values GV of the first pixels P1 of the second display area DA2. In an embodiment, when the image displayed in the first display area DA1 includes a predetermined special pattern, the compensation image data generator 230' may apply the gain GAIN and the offset OFFSET to the grayscale values GV of the second pixels P2 of the first display area DA1.

The gain GAIN and the offset OFFSET may vary depending on a pattern of the displayed image. For example, in a case of a pattern (that is, a special pattern) in which the decrease in luminance due to the black line is not properly compensated only by compensation through the mask MK, the compensation through the mask MK may be performed after applying the gain GAIN and the offset OFFSET to the grayscale value GV of the pixel P (see FIG. 1). However, the present disclosure is not limited to the compensation order.

For example, the gain GAIN and the offset OFFSET can be applied using the following Equation.

$$GV' = \mathrm{GAIN} * GV + \mathrm{OFFSET} \qquad \text{[Equation]}$$

Here, GV' may be a grayscale value to which the gain GAIN and the offset OFFSET are applied.

In an embodiment, the special pattern can be determined experimentally, and the gain GAIN and the offset OFFSET in the special pattern can also be determined experimentally.

In an embodiment, the gain GAIN and the offset OFFSET may increase as the luminance LU increases. In this case, a weight according to luminance may be multiplied by a predetermined gain GAIN and offset OFFSET. However, the present disclosure is not limited to a method of determining the gain GAIN and the offset OFFSET.

Figure 9:
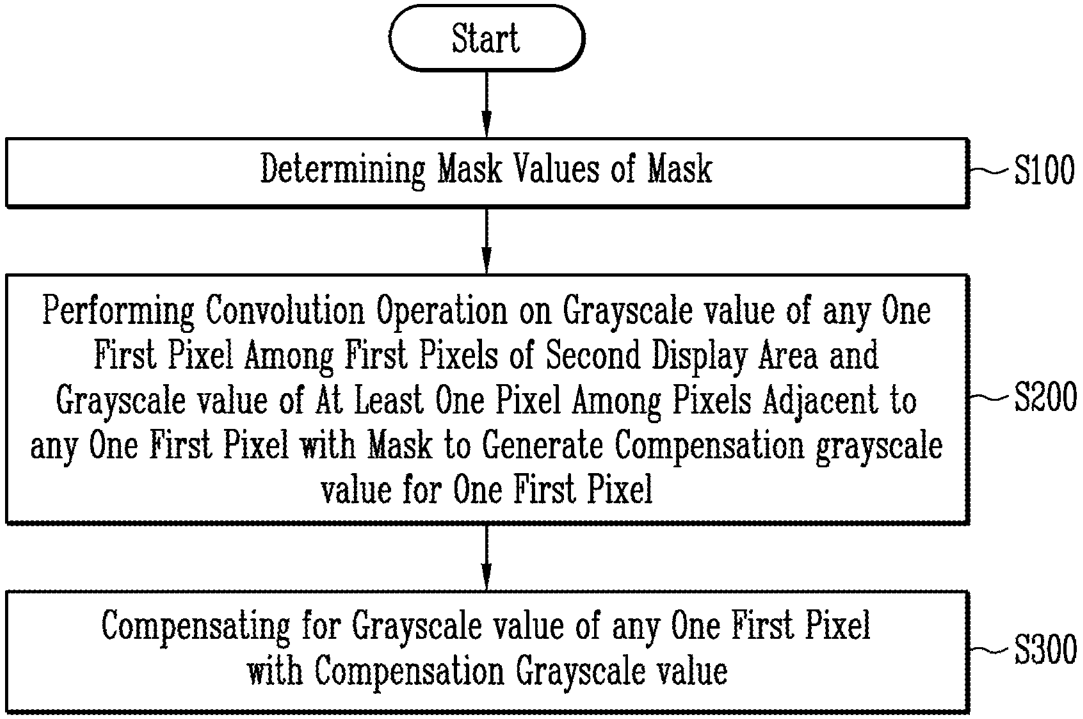
FIG. 9 is a flowchart illustrating a method of driving a display device according to embodiments of the present disclosure.

FIG. 9 is a flowchart illustrating a method of driving a display device according to embodiments of the present disclosure.

Referring to FIG. 9, according to the method of driving the display device, mask values of a mask may be determined (S100). A convolution operation may be performed on a grayscale value of any one first pixel among first pixels of a second display area and a grayscale value of at least one pixel among pixels adjacent to the any one first pixel with the mask to generate a compensation grayscale value for the any one first pixel (S200). In addition, the grayscale value of the any one first pixel may be compensated for with the compensation grayscale value (S300). The compensation grayscale value may be higher than the grayscale value of the first pixel. Accordingly, the decrease in luminance due to a black line can be compensated.

In an embodiment, according to the method of driving the display device, luminance may be predicted based on input image data, and at least one of the mask values may increase as luminance increases.

In an embodiment, when an image displayed in the second display area includes a predetermined special pattern, a gain and an offset may be applied to grayscale values of the first pixels of the second display area. In an embodiment, when an image displayed in a first display area includes a predetermined special pattern, a gain and an offset may be applied to grayscale values of second pixels of the first display area.

Since the detailed description of the steps S100 to S300 has been described with reference to FIGS. 1 to 8, redundant description will be omitted.

Figure 10:
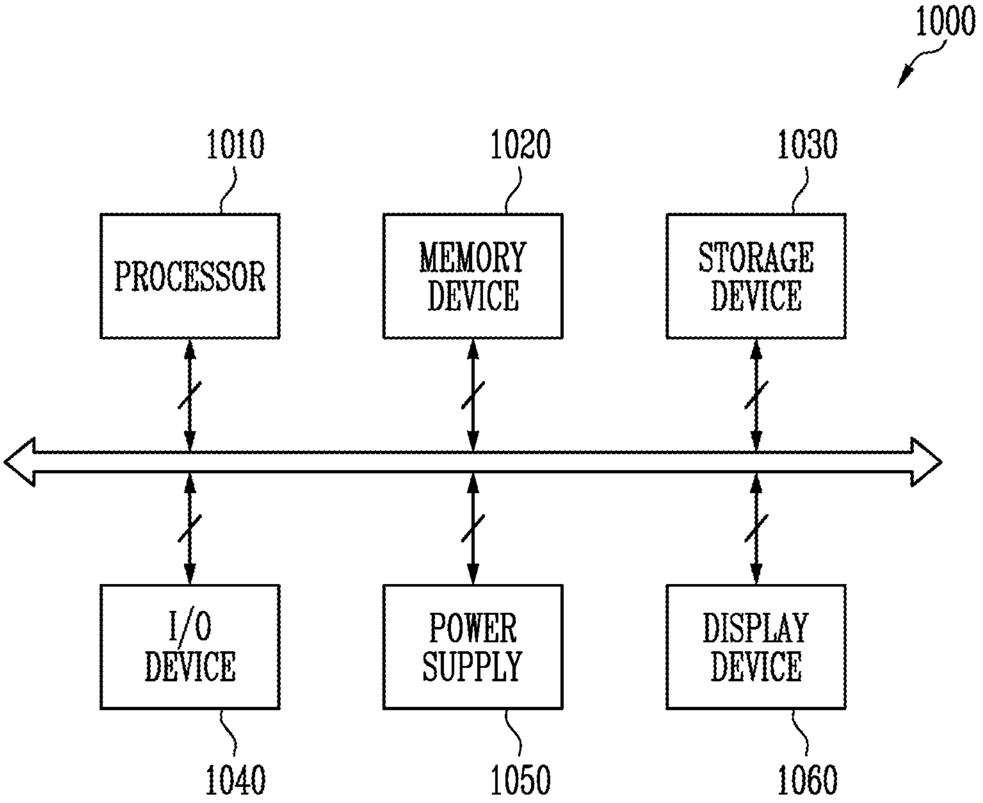
FIG. 10 is a block diagram illustrating an electronic device according to embodiments of the present disclosure.

FIG. 10 is a block diagram illustrating an electronic device according to embodiments of the present disclosure.

Referring to FIG. 10, an electronic device 1000 may include a processor 1010, a memory device 1020, a storage device 1030, an input/output device 1040, a power supply 1050, and a display device 1060. In this case, the display device 1060 may be the display device of FIG. 1. In addition, the electronic device 1000 may further include several ports that can communicate with a video card, a sound card, a memory card, a universal serial bus (USB) device, and the like, or with other systems. In an embodiment, the electronic device 1000 may be implemented as a smartphone. However, this is only an example, and the electronic device 1000 is not limited thereto. For example, the electronic device 1000 may be implemented as a mobile phone, a video phone, a smart pad, a smart watch, a tablet PC, a car navigation system, a car display, a computer monitor, a laptop, a head-mounted display devices, or the like.

The processor 1010 may perform specific calculations or tasks. According to an embodiment, the processor 1010 may be a microprocessor, a central processing unit, an application processor, or the like. The processor 1010 may be connected to other components through an address bus, a control bus, a data bus, and the like. According to an embodiment, the processor 1010 may also be connected to an expansion bus, such as a peripheral component interconnect (PCI) bus.

The memory device 1020 may store data necessary for the operation of the electronic device 1000. For example, the memory device 1020 may include a non-volatile memory device such as an EPROM (erasable programmable read-only memory) device, an EEPROM (electrically erasable programmable read-only memory) device, a flash memory device, a PRAM (phase change random access memory)

device, a RRAM (resistance random access memory) device, a NFGM (nano floating gate memory) device, a PoRAM (polymer random access memory) device, a MRAM (magnetic random access memory) device, or a FRAM (ferroelectric random access memory) device, or a volatile memory device such as a DRAM (dynamic random access memory) device, a SRAM (static random access memory) device, or a mobile DRAM device.

The storage device 1030 may include a solid state drive (SSD), a hard disk drive (HDD), a compact disc read only memory (CD-ROM), or the like.

The input/output device 1040 may include an input means such as a keyboard, a keypad, a touchpad, a touch screen, and a mouse, and an output means such as a speaker and a printer. According to an embodiment, the display device 1060 may be included in the input/output device 1040.

The power supply 1050 may supply a power source necessary for the operation of the electronic device 1000. For example, the power supply 10050 may be a power management integrated circuit (PMIC).

The display device 1060 may display an image corresponding to visual information of the electronic device 1000. In this case, the display device 1060 may be an organic light emitting display device or a quantum dot light emitting display device, but the present disclosure is not limited thereto. The display device 1060 may be connected to other components through the buses or other communication links.

The display device according to the embodiments of the present disclosure may compensate for the decrease in luminance due to the black line.

However, effects of the present disclosure are not limited to the above-described effects, and may be variously extended without departing from the spirit and scope of the present disclosure.

Although specific embodiments and applications have been described herein, they are provided only to aid the overall understanding of the disclosure. The present disclosure is not limited to the above-described embodiments, and various modifications and changes can be made by those skilled in the art from the foregoing descriptions.

Therefore, the spirit of the present disclosure should not be limited to the above-described embodiments, and the scope of the claims set forth below, as well as all equivalents or modifications of the claims, should be considered to fall within the scope of the spirit of the present disclosure.

The present disclosure may be applied to a display device and an electronic device including the same. For example, the present disclosure may be applied to digital TV, 3D TV, a mobile phone, a smart phone, a tablet computer, a VR device, a PC, a home electronic device, a laptop computer, a PDA, a PMP, a digital camera, a music player, a portable game console, a navigation system, or the like.

Embodiments of the present disclosure have been described disclosed through the detailed description and the drawings. However, those skilled in the art or those of ordinary skill in the art will appreciate that various modifications and changes are possible without departing from the spirit and technical scope of the present disclosure as set forth in the claims below.

What is claimed is:

1. A display device comprising:

a display panel including pixels including first pixels having a first viewing angle and disposed in a first display area where an image having the first viewing angle is displayed and a second display area where an image having a second viewing angle is displayed, and second pixels having the second viewing angle and disposed in the first display area and the second display area;

a gate driver that provides gate voltages to a first gate line connected to a first pixel row and a second gate line connected to a second pixel row;

a data driver that provides data voltages to the pixels; and a driving controller that controls the gate driver and the data driver, wherein the driving controller compensates for a grayscale value of at least one first pixel among the first pixels of the second display area, and wherein the first pixel row throughout the first display area and the second display area includes only the first pixels, and the second pixel row throughout the first display area and the second display area includes only the second pixels which are different from the first pixels.

2. The display device of claim 1, wherein the driving controller compensates for the grayscale value of the at least one first pixel among the first pixels of the second display area based on the grayscale value of the at least one first pixel and a grayscale value of at least one adjacent pixel among the pixels adjacent to the at least one first pixel.

3. The display device of claim 2, wherein the driving controller compensates for the grayscale value of the at least one first pixel by performing a convolution operation on the grayscale value of the at least one first pixel and the grayscale value of the at least one adjacent pixel with a mask.

4. The display device of claim 3, wherein at least one of mask values of the mask increases as luminance increases.

5. The display device of claim 4, wherein the driving controller predicts the luminance based on input image data.

6. The display device of claim 1, wherein the driving controller increases the grayscale value of the at least one first pixel to compensate for the grayscale value of the at least one first pixel.

7. The display device of claim 1, wherein the driving controller compensates for a grayscale value of at least one second pixel among the second pixels of the first display area.

8. The display device of claim 1, wherein grayscale values of the first pixels of the second display area before compensation are a lowest grayscale value.

9. The display device of claim 1, wherein grayscale values of the second pixels of the first display area are a lowest grayscale value.

10. The display device of claim 1, wherein the first viewing angle is wider than the second viewing angle.

11. The display device of claim 1, wherein when the image displayed in the second display area includes a predetermined special pattern, the driving controller applies a gain and an offset to grayscale values of the first pixels of the second display area.

12. An electronic device comprising:

a display panel including pixels including first pixels having a first viewing angle and disposed in a first pixel row and second pixels having a second viewing angle and disposed in a second pixel row, a first display area where an image is displayed through first pixels, and a second display area where an image is displayed through second pixels;

a gate driver that provides gate voltages to a first gate line connected to the first pixel row and a second gate line connected to the second pixel row;

a data driver that provides data voltages to the pixels; and a driving controller that controls the gate driver and the data driver, wherein the driving controller compensates for a grayscale value of at least one first pixel among first pixels of the second display area, and wherein sub-pixels included in each of the second pixels are surrounded by a partition wall.

13. A method of driving a display device including a display panel including pixels including first pixels having a first viewing angle and disposed in a first pixel row and second pixels having a second viewing angle and disposed in a second pixel row, a first display area where an image is displayed through first pixels, and a second display area where an image is displayed through second pixels, comprising:

determining mask values of a mask;

performing a convolution operation on a grayscale value of any one first pixel among first pixels of the second display area and a grayscale value of at least one pixel among the pixels adjacent to the any one first pixel with the mask to generate a compensation grayscale value for the any one first pixel; and compensating for the grayscale value of the any one first pixel with the compensation grayscale value.

14. The method of claim 13, wherein at least one of the mask values increases as luminance increases.

15. The method of claim 14, further comprising:

predicting the luminance based on input image data.

16. The method of claim 13, wherein the compensation grayscale value is higher than the grayscale value of the any one first pixel.

17. The method of claim 13, wherein grayscale values of the first pixels of the second display area before compensation are a lowest grayscale value.

18. The method of claim 13, wherein grayscale values of second pixels of the first display area are a lowest grayscale value.

19. The method of claim 13, wherein the first viewing angle is wider than the second viewing angle.

20. The method of claim 13, further comprising:

applying a gain and an offset to grayscale values of the first pixels of the second display area when the image displayed in the second display area includes a predetermined special pattern.

* * * * *